US005989612A

United States Patent [19]

King et al.

[11] Patent Number: 5,989,612

[45] Date of Patent: Nov. 23, 1999

[54] FOODS INCLUDING ANTIMYCOTIC AGENT

[75] Inventors: William King, Walnut Creek, Calif.; Xintian Ming, Madison, Wis.; George Weber, Portland, Oreg.

[73] Assignee: Rodia Inc., Cranburry, N.J.

[21] Appl. No.: 08/944,318

[22] Filed: Oct. 6, 1997

Related U.S. Application Data

[60] Provisional application No. 60/027,937, Oct. 11, 1996.

[51] Int. Cl.[6] .......... A21D 4/00

[52] U.S. Cl. .......... 426/335; 426/532; 426/549; 426/658

[58] Field of Search .......... 426/335, 271, 426/532, 549, 590, 650, 658, 659, 660

[56] References Cited

U.S. PATENT DOCUMENTS

| | | | |
|---|---|---|---|
| 4,874,622 | 10/1989 | Gaynor et al. | 426/135 |
| 5,096,718 | 3/1992 | Ayres et al. | 426/9 |
| 5,217,950 | 6/1993 | Blackburn et al. | 514/2 |
| 5,260,061 | 11/1993 | Ayres et al. | 424/115 |
| 5,458,876 | 10/1995 | Monticello | 424/94.61 |
| 5,573,797 | 11/1996 | Wilhoit | 426/106 |
| 5,573,800 | 11/1996 | Wilhoit | 426/326 |
| 5,573,801 | 11/1996 | Wilhoit | 426/326 |

FOREIGN PATENT DOCUMENTS

| | | |
|---|---|---|
| 50056878 | 12/1975 | European Pat. Off. . |
| 3412083 A1 | 10/1985 | Germany . |
| 3434885 A1 | 3/1986 | Germany . |
| 51-023579 | 7/1976 | Japan . |
| 5-289749 | 10/1993 | Japan . |
| 6225741 | 8/1994 | Japan . |
| WO 95/03396 | 2/1995 | WIPO . |

OTHER PUBLICATIONS

Antimicrobial Activity of Some Food Flavoring Compounds, James M. Jay and Gail M. Rivers, Publication, Nov. 14, 1993, pp. 129–139.

Antifungal Activity of Components of Essential Oils, Nobuyuki Kurita, Makoto Miyaji, Ryuichiro Kurane and Yoshimasa Takahara. Agri. Biol. Chem. 45 (4), pp. 945–952, 1981.

Evaluation of the Antifungal Acitivity of Some Components of Volatile Oils Against Dermotophytes, R. T. Yousef, M.E. Aggag and Gisele G. Tawil, Mykosen 21 (6) pp. 190–193, Grosse Verlag 1978.

Antimicrobial Activity of Aroma Chemicals and Essential Oils, J.A. Morris, A. Khettry and E.W. Seitz, Research and Development Department, International Flavors and Fragrances, Inc., Union Beach, New Jersey, pp. 595–603.

Chemical Significance of the Volatile Components of Spices in the Food Preservative Viewpoint–IV. Structure and Antibacterial Activity of Terpenes, Teruhisa Katayama and Isamu Nagai, Bulletin of the Japanese Society of Scientific Fisheries, pp. 29–32, vol. 26, No. 1, 1960.

*Primary Examiner*—Leslie Wong
*Attorney, Agent, or Firm*—Andrew M. Solomon; John A. Shedden

[57] ABSTRACT

A food or beverage or animal feed composition which includes an antimycotic effective amount of propionibacteria metabolites with the proviso that such metabolites not solely contain propionic acid is provided. Also disclosed is the addition of a potentiator in combination with such metabolites.

19 Claims, No Drawings

FOODS INCLUDING ANTIMYCOTIC AGENT

This application claims the benefit of U.S. Provisional Application No. 60/027,937, filed on Oct. 11, 1996.

BACKGROUND OF THE INVENTION

1. Field of the Invention

The present invention relates to substances which inhibit yeast and mold spoilage in food and animal feed products.

2. Technology Description

Relevant Prior art may be found in U.S. Pat. Nos. 5,096,718 and 5,260,061 and the references cited therein. These patents disclose the use of certain propionic metabolites in certain foods to increase the shelf life of the resulting products.

JP 07-115950 suggests the combination of bacteriocins produced by lactic acid bacteria of propionibacterium in combination with either organic acids and their salts, fatty acid esters of polyhydric alcohols, amino acids, antibacterial peptides and proteins, polysaccharides comprising sugars, saccharic acids and amino sugars and their partial decomposition products, spices and their essential oils and plant components; and alcohols. The reference fails to suggest that the combination can be used to prevent the deterioration of foods as a result of mold and yeast (i.e., provide an antimycotic effect) by using the combination of bacteriocins with organic acids and their salts, fatty acid esters of polyhydric alcohols, amino acids, antibacterial peptides and proteins, polysaccharides comprising sugars, saccharic acids and amino sugars and their partial decomposition products, spices and their essential oils and plant components; and alcohols. The only mention in this reference in the treatment of foods having a pH of greater than 5.5, is in connection with a hamburger composition, which, by definition would not suffer from mycotic bacteria (i.e., yeast and mold spoilage).

Despite the above teachings, there still exists a need in the art for expanding the use of propionibacteria metabolites to high pH foods, animal feeds and baked goods and to use such metabolites in combination with potentiators to provide a synergistic effect on antimycotic activity.

BRIEF SUMMARY OF THE INVENTION

It is now discovered, quite surprisingly, that the following types of foods which are ordinarily susceptible to spoilage by mold and/or yeast can utilize the compositions disclosed in U.S. Pat. No. 5,260,061 for their antimycotic properties: various baked goods including cakes, snack cakes, cookies, frostings, cheesecakes, pie crusts, pie fillings, confections, biscuits, batters, brownies, specialty breads, pastas, and any other food or beverage which has a pH of greater than 5.5, more preferably greater than 5.8 and most preferably greater than 6.0. The composition as disclosed in U.S. Pat. No. 5,260,061 provides a mature propionibacterium growth medium that can provide inhibition of yeasts. This effect can occur without providing an undesirable flavor, odor, or appearance, even in "delicate" foods. The unexpected findings disclosed are especially dramatic in light of the breadth of activity and some of the low concentrations which provide yeast inhibition. An anti-yeast food additive can be obtained by growing propionibacteria, e.g. *Propionibacterium shermanii, P. freudenreichii, P. pentosaceum, P. thoenii, P. arabinosum, P. rubrum, P. jensenii, P. peterssonii*, and related species (as identified in Malik et al., Can. J. Microbiol. 14:1185, 1968) in a milk, cheese whey, or broth medium, or other suitable nutrient mixtures. The resulting growth liquid can then be added to food and feed products to inhibit yeasts and molds. To facilitate storage and shipment, the growth liquid may be dried to form a powder or frozen before use as an anti-yeast food additive. The metabolites may be separated or purified or used as a mixture. Powdered or liquid natural metabolites of propionibacteria can be incorporated into various foods and feeds to render them less susceptible to spoilage by growth and/or enzymatic activity of yeasts. Anti-yeast activity may be obtained by incorporating viable propionibacteria directly into a food.

The growth medium for such Propionibacterium species may be formulated with milk or whey containing yeast extractives or fruit juices or any other broth media containing appropriate growth nutrients. The growth liquid, after development of the propionibacteria up to $10^6$ to $10^{10}$ cells per ml, may be heat treated (pasteurized) to kill the inoculated and adventitious bacteria prior to use in liquid, condensed, dried, or frozen form. It is added in various concentrations (preferred between 0.01 and 10% of total weight) to food or feed where it functions to inhibit yeasts. This inhibition enables the shelf life and storage times of the food or feed to be increased.

In addition, the above materials may also be combined with certain potentiators such as EDTA, vanillin compounds (e.g., methyl vanillin or ethyl vanillin), citrate and/or its salts, sorbate and/or its salts or inositols to provide a synergistic antimycotic effect against a wider range of yeast and mold species over a broader range of effective pH levels.

It is an object of the present invention to provide a food product which includes a substance to inhibit the growth of yeasts and molds in high pH foods and feeds without harming the flavor, aroma, or other characteristics of the food product.

This, and other objects, will readily be apparent to those skilled in the art as reference is made to the detailed description of the preferred embodiment.

DETAILED DESCRIPTION OF THE PREFERRED EMBODIMENTS

In describing the preferred embodiment, certain terminology will be utilized for the sake of clarity. Such terminology is intended to encompass the recited embodiment, as well as all technical equivalents which operate in a similar manner for a similar purpose to achieve a similar result.

To the extent necessary for completion, the disclosures of U.S. Pat. Nos. 5,096,718 and 5,260,061 are hereby incorporated by reference.

For the purpose of this disclosure, "metabolite" is defined as a substance, other than water, produced by propionibacteria. An "active metabolite" or an "inhibitory metabolite" is a metabolite which inhibits the growth or reproduction of an undesired yeast or mold.

There are several aspects to the present invention as set forth below. It has been found possible to inhibit spoilage yeasts and molds and thereby extend the shelf life of many food products without adversely affecting flavor or aroma by adding a fermented growth mixture that may or may not contain viable organisms based on propionibacterium cultures with its metabolites or a fraction of such a growth mixture which fraction contains one or more inhibitory metabolites other than propionic acid. The mixture or fraction has a greater inhibitory effect than a weight of pure propionic acid which is equal to the pure propionic acid content of the mixture or fraction. Such substances are surprisingly excellent inhibitors of yeasts and molds.

Examples of the present invention are set forth hereinafter. It is intended that they be only illustrative. Propionibacterium strains identified by number are available from the American Type Culture Collection (ATCC). The other cultures are widely available or can be obtained from Oregon State University, Corvallis, Oreg., without cost. For example, *Propionibacterium freudenreichii* subsp. shermanii, ATCC strain #9616 can be used in accordance with the present invention.

It is discovered that Propionibacterium cultures can be used to produce a material, including one or more metabolites (other than propionic acid) that inhibit yeast and mold. The metabolites, which can be obtained as by-products of propionibacterial culture fermentation of skim milk or other suitable medium can serve as flavor adjuncts and may also be inhibitory to a number of microorganisms, including themselves at the finish of fermentation. The shelf-life of a food product is extended by providing in or on the product one or more of such active metabolites. The degree of inhibition achieved is much greater than is due to propionic acid alone in the mixtures of metabolites studied. In some cases where excellent inhibition occurs, the amount of propionic acid is so low as to have no measurable effect at all. Also, end use levels of propionic acid less than about 0.1% are not accepted to be useful for inhibition of yeasts in general, or of molds in high pH (greater than about 5.5) systems. This indicates that some other unidentified inhibitory substance or combination of substances in propionibacteria fermented growth mixtures may be responsible for the excellent ability of such growth mixtures to extend the shelf life of food products against yeast and mold spoilage. While not wishing to be bound to any specific theory, it is believed that metabolites (other than propionic acid) may be responsible for such performance properties.

Small amounts of viable propionibacteria are used in the manufacture of Swiss cheese to form eyes by the production of $CO_2$ and to impart the characteristic Swiss cheese flavor. In most food products, however, the presence of viable propionibacterial and Swiss cheese flavor would be unacceptable, eyes would not be desired, and $CO_2$ release may cause physical defects or bloat packaging materials.

To facilitate storage and shipping, a propionibacteria growth mixture may be evaporated and frozen, or concentrated and dehydrated, e.g., by spray-drying, or freeze-drying, to form a powder.

A material according to the present invention is most readily used by mixing with and/or applying on a blendable food product, but should also be effective to treat the surface of solid food products, or the interior of such products, e.g. by injection. The optimum amount to be used will depend on the composition of the particular food product to be treated, but can be determined by simple experimentation.

In most instances, substantial improvements in shelf life can be obtained by adding the material in and/or applying on an amount sufficiently small that it will have no deleterious effect on the flavor or aroma of the food product. This is possible because the material includes at least one propionibacteria metabolite which is active in inhibiting yeast and mold and does not impart a strong flavor such as that of propionic acid. More specifically, the liquid, condensed, or dried product, which typically comprises pasteurized cultured solids or liquids, containing the propionibacteria metabolites, is added to the food product in amounts between about 0.1 to about 2.0 percent by weight of the product, more preferably between about 0.25 to about 1.0 percent by weight of the product and most preferably between about 0.5 to about 0.75 percent by weight of the product. In the case where the agent is added to a dry mix to which is added liquid ingredients and thereafter cooked, such as a cake, the amount added is by weight of the rehydrated (wet) mix prior to cooking.

Commercially available materials, more specifically pasteurized cultured solids or liquids including propionibacteria metabolites are sold by Rhône-Poulenc Inc. under the MICROGARD® trademark. MICROGARD® MG 100 is a pasteurized cultured skim milk that is standardized with skim milk solids and spray dried. MICROGARD® MG 200 is a pasteurized cultured dextrose that has been standardized with maltodextrin and spray dried. MICROGARD® MG 250 is a condensed (frozen or liquid) version of the cultured dextrose product.

While the use of the propionibacterial metabolites, per se, can be used to inhibit yeast and mold on many foods, when combined with certain potentiating agents, a synergistic antimycotic effect is noticed. The potentiators which are preferred for use can be selected from the group consisting of chelators (e.g., EDTA (ethylenediamine tetraacetic acid) and inositol), the group consisting of essential oils and flavors (e.g., methyl vanillin, ethyl vanillin, allyl isothiocyanate, and guiacol), the group consisting of organic acids and salts of organic acids other than propionic acid, acetic acid and lactic acid and their respective salts (e.g., dimethyl fumarate, sodium citrate, potassium sorbate), enzymes such as lysozyme. In practice, these potentiators are used in combination with the propionic bacteria metabolites in amounts ranging from about 50 to 2500 ppm by weight of the final food composition, more preferably between about 75 to about 800 ppm by weight of the final food composition.

The specific mechanism for why the combination yields synergistic results is not completely understood. One theory is that the "potentiator" functions to potentiate the metabolites. An alternative theory is that the metabolites are responsible for potentiating the "potentiator". Either theory is to be expressly covered by this invention.

The propionibacterial metabolite(s), optionally in combination with the potentiator, can be used in a number of foods which, prior to the present invention, were not believed possible. For example, prior teachings have suggested that propionibacterial metabolites can effectively operate in foods having an acidic pH (i.e., pH less than about 5.5). Specific classes of foods suggested in accordance with U.S. Pat. No. 5,260,061 include dairy foods, cultured foods, yogurt, Kissle-type products, fruit juice, salad dressings, pasta, sausages, and other meat products such as chicken, fish, crab and hamburger. Applicants have surprisingly discovered that propionibacterial metabolites, optionally in combination with the potentiator, can be used in connection with foods susceptible to spoilage by yeast and, more specifically, mold having a pH of greater than about 5.5, more preferably greater than about 5.8 and most preferably greater than about 6.0. In addition, the combination of propionibacterial metabolites with the potentiator can be used in connection with foods not suggested in the prior art.

Examples of foods which can be produced in accordance with the present invention include baked goods including cakes, snack cakes, cookies, frostings, cheesecakes, pie crusts, pie fillings, confections, biscuits, batters, brownies, specialty breads, ambient sauces and condiments, and pastas. This above listing is not intended to be limiting as the invention specifically includes any food or beverage having a pH of greater than about 5.5 which is ordinarily susceptible to spoilage by yeast and/or mold.

It is also expected that the above metabolite(s) can be effective in extending the shelf-life of animal feeds with a pH greater than about 5.5.

The following non-limiting examples illustrate, generally, the effectiveness of propionibacterial metabolites plus potentiating agents, particularly in high pH foods, as materials that protect against spoilage yeasts and molds.

EXAMPLE 1

Coffee Cake Mold Testing

To 100 parts of a dry coffee cake mix including the following ingredients in the following weight ratios (sugar: 11.4 parts, vegetable shortening: 11.4 parts, butter: 11.4 parts, bran flour: 6.0 parts, brown sugar: 5.7 parts, skim milk powder: 4.3 parts, honey: 2.8 parts; wheat germ: 2.0 parts, salt: 1.8 parts, soy flour (defatted): 1.0 parts, nutmeg (ground): 0.2 parts, egg yolks: 11.4 parts, egg white: 8.5 parts, vanilla: 0.2 parts, yeast: 5.7 parts, bread flour: 68.0 parts and cake flour: 23.0 parts) is added the following potential antimycotic agents to form four sample mixes:

Sample A: Control (no agent added)

Sample B: 0.2% (by weight of the final dry mixture) of Calcium Propionate

Sample C: 0.75% (by weight of the final dry mixture) of MICROGARD® MG 200

Sample D: 0.75% (by weight of the final dry mixture) of MICROGARD®) MG 200 and 500 ppm methyl vanillin (by weight of the final dry mixture)

To each of the above mixtures is added 20.7 parts of water, the mixture is agitated with a hand mixer to uniformly disperse the dry mix into the water to form a cake batter and the batter is allowed to fully rise and is poured into a pan and baked at 360–380° F. for about 20 minutes. The baked cakes are then allowed to cool to ambient temperatures and are wrapped with a clear and colorless polyethylene film. The cakes are maintained at room temperature for a period of time until mold forms on the cake. The average days to molding of the cake samples is as follows:

Sample A: Three Days

Sample B: Seven to Ten Days

Sample C: Four to Five Days

Sample D: Twenty-one to Twenty-eight Days

EXAMPLE 2

Cheese Cake Yeast Testing

To produce a cheesecake filling, the following is added to 3 cups of cottage cheese and 3 whole eggs and mixed until uniform: ¾ cup of whipping cream, 3 tablespoons of melted butter, 5 tablespoons of sugar, ½ teaspoon lemon juice, ½ teaspoon grated lemon rind. Three fillings are produced, two as controls and one including 1.5 percent MICROGARD® MG 100 and 500 ppm methyl vanillin. The fillings are then poured into a crust and the cake is baked at 350° F. for about 45 minutes or until the filling is firm.

The three cakes are stored at 40° F. for a period of six weeks after baking in order to determine the amount of yeast present in the cake. The results are as follows in Table 1. All data is presented in colonies per gram of yeast:

TABLE 1

| Storage Time | Control #1 | Control #2 | Cake including 1.5 percent MICROGARD ® MG 100 and 500 ppm methyl vanillin |
|---|---|---|---|
| One Week | 35,000 | 85,000 | 500 |
| Two Weeks | 76,000 | 72,000 | <100 |
| Three Weeks | 173,000 | 57,000 | <100 |
| Four Weeks | 1,140,000 | 630,000 | 200 |
| Five Weeks | 10,500,000 | 4,500,000 | <100 |
| Six Weeks | 11,200,000 | 56,000,000 | <100 |

EXAMPLE 3

In Vitro testing—MICROGARD+vanillin

Combinations of MICROGARD® MG-250 (condensed pasteurized cultured dextrose) and methyl vanillin are tested in Mycophil broth. The broth is adjusted to pH 6.5 and 5.3, and inoculated with either yeast (*Rhodotorula mucilaginosa var. mucilaginosa*) at about 5 log CFU/ml or mold spores (*Aspergillus niger*) at about 3 log spores/ml. The inoculated broth tubes are incubated at 30° C. for 24 hours for yeast and 48 hours for molds. Inhibition of yeast growth under different treatments is assayed by plate count and reported as CFU/ml. Inhibition of mold growth is recorded by visual observation and reported as no growth, slight growth (+) medium growth (++) or extended growth (+++). The results are shown in the following Tables 2 and 3.

TABLE 2

Inhibition of MICROGARD ® MG-250 (MG) with methyl vanillin (V) against yeast at pH 5.3 and 6.5

| Treatment | CFU/m | |
|---|---|---|
| | pH 5.3 | pH 6.5 |
| None | $1.6 \times 10^7$ | $8.3 \times 10^7$ |
| 0.5% MG | $8.5 \times 10^5$ | — |
| 1% MG | $6.3 \times 10^4$ | $2.3 \times 10^7$ |
| 500 ppm V | $1.3 \times 10^7$ | $5.2 \times 10^7$ |
| 500 ppm V + 0.5% MG | $5.1 \times 10^4$ | — |
| 500 ppm V + 1% MG | $1.3 \times 10^2$ | $7.2 \times 10^5$ |

TABLE 3

Inhibition of MICROGARD ® MG-250 (MG) with methyl vanillin (V) against mold at pH 5.3 and 6.5

| Treatment | Growth* | |
|---|---|---|
| | pH 5.3 | pH 6.5 |
| None | +++ | +++ |
| 0.5% MG | ++ | not tested |
| 1% MG | + | +++ |
| 500 ppm V | +++ | +++ |
| 500 ppm V + 0.5% MG | no growth | not tested |
| 500 ppm V + 1% MG | no growth | + |

EXAMPLE 4

In Vitro Testing—MICROGARD® and Potassium Sorbate

Combinations of MICROGARD® MG-200 with potassium sorbate are evaluated in Potato dextrose broth. The broth is adjusted to pH 6.0 or 4.0, and inoculated with mold spores (Penicillium spp.) at about 3 log spores/ml. The inoculated broth tubes are incubated at 25° C. for 5 days. Inhibition of mold growth is recorded by visual observation and reported as no growth, slight growth (+), medium growth (++) or extended growth (+++). The results are shown in Table 4.

TABLE 4

Inhibition of MICROGARD ® MG-200 (MG) with sorbate (S) against mold at pH 4.0 and 6.0

| Treatment | Mold Growth pH 4.0 | Mold Growth pH 6.0 |
|---|---|---|
| None | +++ | +++ |
| 0.5% MG | ++ | +++ |
| 500 ppm Sorbate | ++ | +++ |
| 1000 ppm Sorbate | + | +++ |
| 500 ppm S + 0.5% MG | no growth | no growth |
| 1000 ppm S + 0.5 % MG | no growth | no growth |

The above in vitro data demonstrates that MICROGARD® in combination with 500 ppm vanillin or sorbate greatly increases its inhibitory activity against yeast or/and mold at pH 5.3 and 6.5. The synergistic antimycotic effect generated by the combination makes the resulting food product containing the combination more inhibitory against mold and yeast, especially at higher pH values where neither single component is especially inhibitory.

EXAMPLE 5

In Vitro Testing—MICROGARD® and EDTA

MICROGARD® MG-200 is used in combination with disodium-EDTA in Potato dextrose broth. The broth is adjusted to pH 6.0 or 5.3, and inoculated with mold spores (Penicillium spp. from moldy cheese) at about 3 log spores/ml. The inoculated broth tubes are incubated at 25° C. for 7 days. Inhibition of mold growth is recorded by visual observation and reported as no growth, slight growth (+), medium growth (++) or extended growth (+++). The results are shown in Table 5.

TABLE 5

Inhibition of MICROGARD ® MG-200 (MG) with disodium EDTA (EDTA) against mold at pH 5.3 and 6.0

| Treatment | Mold Growth pH 5.3 | Mold Growth pH 6.0 |
|---|---|---|
| None | +++ | +++ |
| 1.0% MG | ++ | +++ |
| 500 ppm EDTA | ++ | ++ |
| 1000 ppm EDTA | ++ | + |
| 500 ppm EDTA + 1.0% MG | no growth | no growth |
| 1000 ppm EDTA + 1.0% MG | no growth | no growth |

The above in vitro data demonstrates that MICROGARD ® in combination with 500 or 1000 ppm EDTA greatly increases its inhibitory activity against mold at pH 5.3 and 6.0. The synergistic antimycotic effect generated by the combination makes the resulting food product containing the combination more inhibitory against mold, especially at higher pH values where neither single component is especially inhibitory.

EXAMPLE 6

In Vitro Testing—MICROGARD® and Lysozyme

MICROGARD® MG-200 (MG) is used in combination with lysozyme (Ly) in Potato dextrose broth at pH 6.0 to determine its utility in reducing yeast (*Zygosaccharomyces bailii*). As compared to a control which contains neither MG nor Ly, the addition of either 0.5% MG or 1000 ppm Ly to the control does not effectively reduce the amount of yeast in the broth. When a combination of 0.5% MG and 1000 ppm Ly is added to the broth, the amount of yeast is reduced to a value of zero. This data demonstrates the synergistic effect against yeast resulting from the combination of MG with Ly.

Having described the invention in detail and by reference to the preferred embodiments thereof, it will be apparent that modifications and variations are possible without departing from the scope of the appended claims.

What is claimed is:

1. A food or beverage composition having increased resistance against spoilage caused by mold and/or yeast and having a pH of greater than about 5.5 and which is selected from the group consisting of cakes, snack cakes, cookies, frostings, cheesecakes, pie crusts, pie fillings, confections, biscuits, batters, brownies, specialty breads, ambient sauces and condiments and mixtures thereof which includes an antimycotic effective amount of a composition comprising: (a) propionibacteria metabolites with the proviso that such metabolites not solely comprise propionic acid; and (b) a potentiator selected form the group consisting of chelators, essential oils, flavors, organic acids other than propionic, acetic or lactic acid and salts of organic acids other than propionic, acetic or lactic acid, enzymes and mixtures thereof.

2. The food or beverage composition according to claim 1 wherein the pH is greater than 5.8.

3. The food or beverage composition according to claim 2 wherein the pH is greater than 6.0.

4. The food or beverage composition according to claim 1 wherein said metabolites are present in pasteurized cultured solids or liquids.

5. The food or beverage composition according to claim 4 wherein the amount of pasteurized cultured solids or liquids containing said propionibacterial metabolites is between about 0.1 to about 2.0 percent by weight of the composition.

6. The food or beverage composition according to claim 5 wherein the amount of pasteurized cultured solids or liquids containing said propionibacterial metabolites is between about 0.25 to about 1.0 percent by weight of the composition.

7. The food or beverage composition according to claim 6 wherein the amount of pasteurized cultured solids or liquids containing said propionibacterial metabolites is between about 0.50 to about 0.75 percent by weight of the composition.

8. The food or beverage composition according to claim 1 wherein said potentiator is selected from the group consisting of EDTA (ethylenediamine tetraacetic acid), inositol, citric acid or its salts, sorbic acid or its salts, allyl isothiocyanate, fumaric acid or its salts, methyl vanillin, ethyl vanillin, guiacol, lysozyme and mixtures thereof.

9. The food or beverage composition according to claim 8 wherein said potentiator is present in an amount ranging between about 50 to about 2500 ppm by weight of the composition.

10. The food or beverage composition according to claim 9 wherein said potentiator is present in an amount ranging between about 75 to about 800 ppm by weight of the composition.

11. An composition comprising an antimycotic effective amount of propionibacterial metabolites and a potentiator selected from the group consisting of EDTA (ethylenediamine tetraacetic acid), inositol, allyl isothiocyanate, methyl vanillin, ethyl vanillin, guiacol and mixtures thereof with the proviso that such metabolites not solely comprise propionic acid.

12. The composition according to claim 11 wherein said metabolites are present in pasteurized cultured solids or liquids.

13. The composition according to claim 12 wherein the weight ration of said pastuerized cultured solids or liquids containing said propionibacterial metabolites to said potentiator is from about 0.1 to about 2.0 parts pasteurized cultured solids or liquids to about 0.0050 to about 0.25 parts potentiator.

14. The composition according to claim 11 wherein said propionibacteria metabolites are prepared by growing *Propionibacterium shermanii, Propionibacterium freudenreichii, Propionibacterium pentosaceum, Propionibacterium thoenii, Propionibacterium arabinosum, Propionibacterium rubrum, Propionibacterium jensenii,* and/or *Propionibacterium peterssonii* in a milk, cheese whey, or broth medium, or suitable nutrient mixtures thereof.

15. A process for preserving a food or beverage product having a pH of greater than about 5.5 and which is selected from the group consisting of cakes, snack cakes, cookies, frostings, cheesecakes, pie crusts, pie fillings, confections, biscuits, batters, brownies, specialty breads, ambient sauces and condiments and mixtures thereof against spoilage caused by yeast and/or mold comprising the step of adding to the food or beverage product an antimycotic effective amount of propionibacteria metabolites and a potentiator with the proviso that such metabolites not solely comprise propionic acid.

16. The process according to claim 15 wherein said propionibacteria metabolites are prepared by growing *Propionibacterium shermanii, Propionibacterium freudenreichii, Propionibacterium pentosaceum, Propionibacterium thoenii, Propionibacterium arabinosum, Propionibacterium rubrum, Propionibacterium jensenii,* and/or *Propionibacterium peterssonii* in a milk, cheese whey, or broth medium, or suitable nutrient mixtures thereof.

17. The process according to claim 16 wherein said potentiator is selected from the group consisting of EDTA (ethylenediamine tetraacetic acid), inositol, citric acid and its salts, sorbic acid and its salts, fumaric acid and its salts, methyl vanillin, ethyl vanillin, allyl iso-thiocyanate, guiacol, lysozyme and mixtures thereof.

18. The process according to claim 17 wherein said propionibacterial metabolites are present in pasteurized cultured solids or liquids and wherein said pasteurized cultured solids or liquids are present in an amount of between about 0.1 to about 2.0 percent by weight of the composition.

19. The process according to claim 18 wherein said potentiator is present in an amount ranging between about 50 to about 2500 ppm by weight of the composition.

* * * * *